United States Patent [19]

Beauducel et al.

[11] Patent Number: 5,243,337
[45] Date of Patent: Sep. 7, 1993

[54] PROCESS AND DEVICE FOR OPTIMIZING SIGNAL TRANSMISSION RATES ON MULTIFUNCTIONAL WELL CABLES

[75] Inventors: Claude Beauducel, Henonville; Jacques Cretin, Le Chesnay; Daniel Saussier, Le Port Marly, all of France

[73] Assignee: Institut Francais du Petrole, Rueil Malmaison, France

[21] Appl. No.: 875,321

[22] Filed: Apr. 29, 1992

[30] Foreign Application Priority Data

Apr. 29, 1991 [FR] France .................................. 91 05375

[51] Int. Cl.[5] ............................................. G01V 1/00
[52] U.S. Cl. ..................... 340/855.3; 340/855.4; 340/855.7; 340/855.8
[58] Field of Search ............... 340/855.3, 855.4, 855.7, 340/855.8; 364/422

[56] References Cited

U.S. PATENT DOCUMENTS

| 3,514,750 | 5/1970 | Pritchett et al. | 340/855.1 |
| 5,051,991 | 9/1991 | Szczutkowski | 375/122 |
| 5,083,124 | 1/1992 | Nordstrum | 340/853 |

FOREIGN PATENT DOCUMENTS 25895 4/1981 European Pat. Off. .
398581 11/1990 European Pat. Off. .

Primary Examiner—J. Woodrow Eldred
Attorney, Agent, or Firm—Antonelli, Terry, Stout & Kraus

[57] ABSTRACT

A process for optimizing the transmission rates of digitized signals on transmission lines in multifunction cables, such as logging cables linking well tools to surface installations. The process includes digitising of the data to be transmitted and coding thereof through voltages selected from a set of multilevel coding voltages (2 to 32 for example), and widening towards high frequencies of the passband of each transmission line used, by combination with correcting circuits selected so that the transfer function of the corrected line is substantially that of a filter of the Bessel type, at least in a given frequency range on either side of a 3-dB cut-off frequency fc which depends on the number of coding voltages and on the amplification parameters. Using this process makes it possible to exceed very easily a total flow rate higher than one Mbits/s without increasing the transmission error rate.

6 Claims, 5 Drawing Sheets

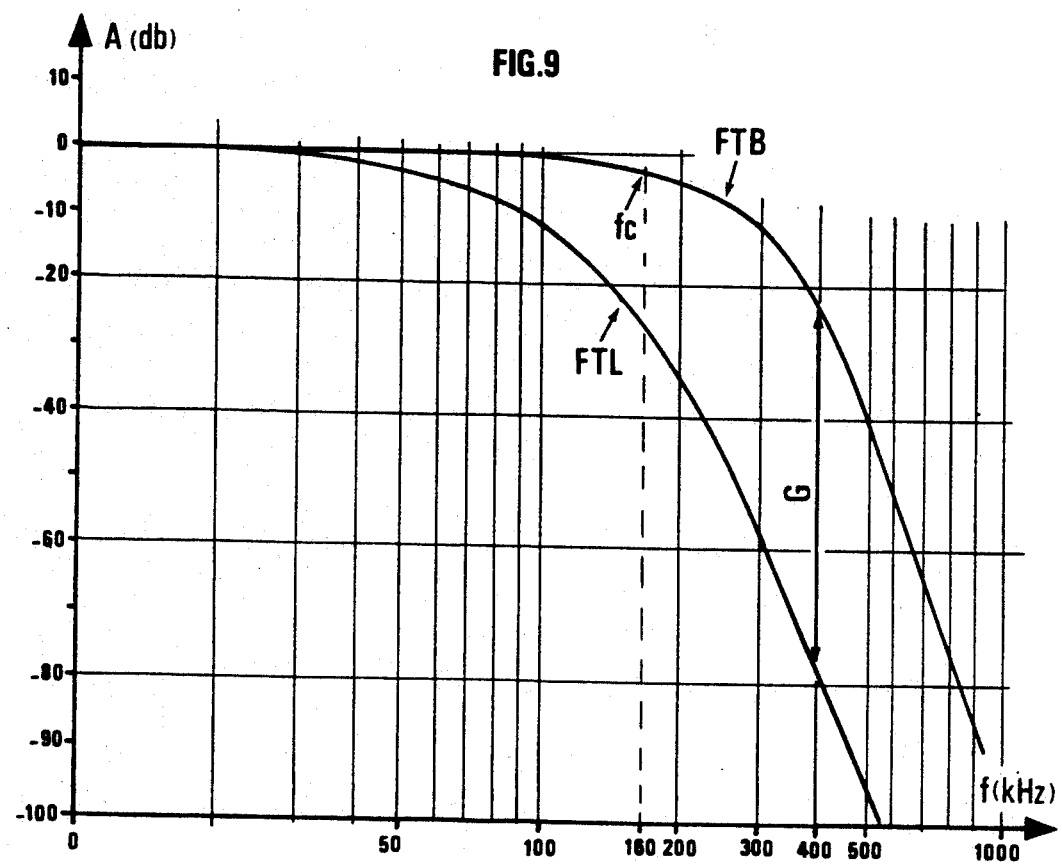
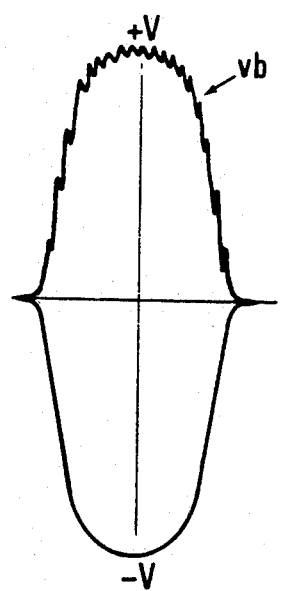
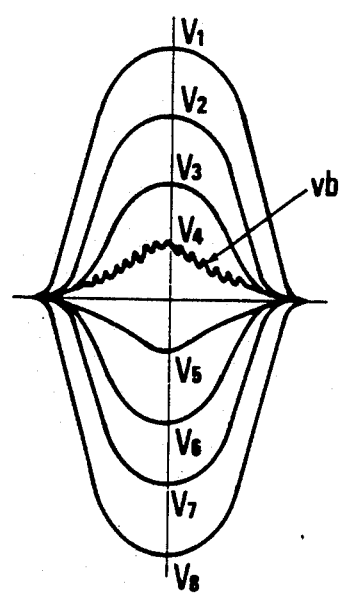

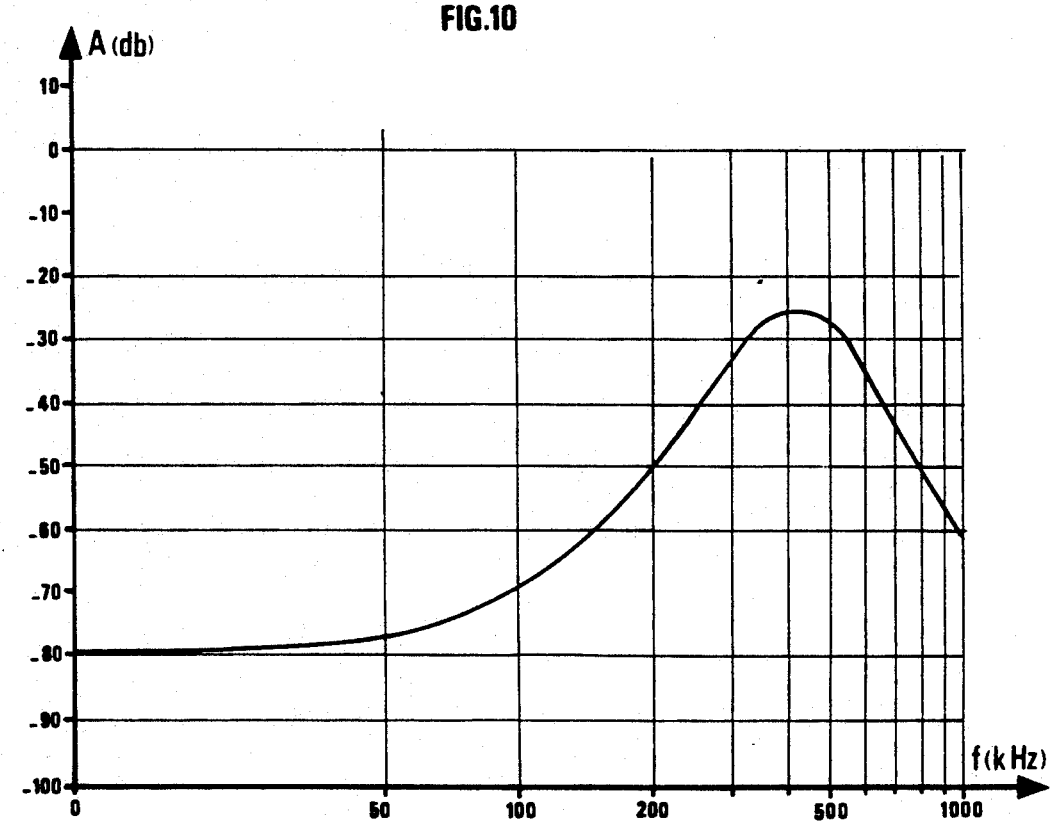

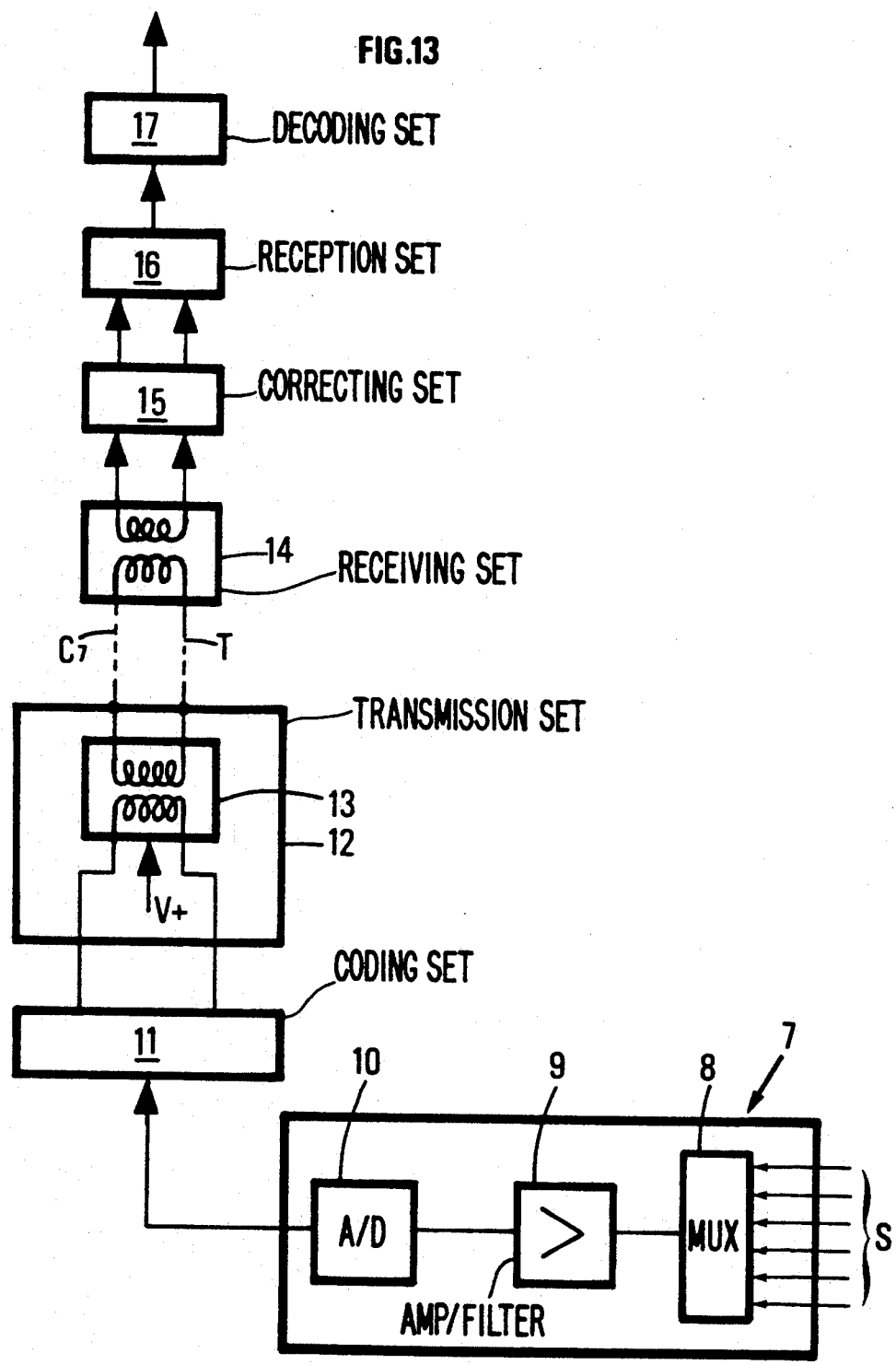

PROCESS AND DEVICE FOR OPTIMIZING SIGNAL TRANSMISSION RATES ON MULTIFUNCTIONAL WELL CABLES

BACKGROUND OF THE INVENTION

The present invention relates to a process and a device for optimizing the flow rate of information passing through a multifunction cable, such as for example a cable linking a well tool to a surface installation.

When measuring and/or intervention are to be carried out in a well, tools are generally used which are lowered at the end of a multifunction cable, such as a cable known as logging cable. Such a logging cable can withstand tensile stresses and comprises several lines allowing the transmission of electrical energy to the bottomhole tools, as well as exchange of control and measuring signal between the tools and a surface installation.

The downhole tools consist, for example, of one or several sondes which may be locked in the well as a result of the opening of fastening arms under the action of hydraulic jacks. The hydraulic energy is provided by a downhole hydraulic generator supplied with electric power from a surface source through supply lines included in the cable. The surface power source is also linked to electric motors or to electromagnetic means arranged in the tools through these lines. Other lines of the cable are used for transmitting control signals to the tools and, in return, for transmitting measuring signals to a surface recording device.

Various well sondes are described in U.S. Pat. Nos. 4,428,422, 4,616,703, 4,862,425, 4,901,289.

There are numerous applications for which a large number of measuring sensors are contained in well equipment. It is notably the case in the field of seismic prospecting of wells, where an array of sensors such as geophones is used and can be distributed in a main sonde and possibly in one or several satellite sondes at various depths. The sensed signals must be transmitted to a surface recording apparatus. The number of sensors and the frequency of the signals received generally justify the transmission thereof in digitized and coded form with a high transmission rate.

The passband of the transmission lines included in the cable is generally relatively low. When the rate of the data to be transmitted becomes high enough, the limited performance of the lines acts as a brake, which make it necessary to provide the electronic systems of the tools with powerful buffer memories.

The multifunction cable which is most commonly used for petroleum applications, for example, comprises a central line, a plurality of lines arranged in rings and an outer metallic sheath.

A process for improving the rate of the data which can pass through such a cable is well-known through U.S. Pat. No. 4,855,732, this process essentially comprising transmitting between the central line and the outer sheath the coded data according to a bipolar code such as code HDB3, well-known by specialists. With such a lay-out, rates higher than 100 kilobits/second (kb/s), or even higher than 200 kb/s by optimizing the transmission factors, can be easily reached over distances of several kilometers The present evolution of well measuring equipment makes it more and more necessary to further increase the transmission rates in order to accommodate the increase in the stream of data to be transmitted towards the surface installations.

A conventional solution used in the telecommunication field would consist in utilizing cables with a wider passband. This is not possible for transmissions in wells where a standard logging cable generally available on the site has to be used.

SUMMARY OF THE INVENTION

The process according to the invention makes it possible to avoid the limitations imposed by the existing multifunction cables (logging cables) and to optimize the transmission rate of signals on transmission lines included in said cables in order to obtain the high flow rates necessary for transmitting the volumes of data collected by the sensors in the most recent well equipment, without modifying the allowable transmission error rate.

The process comprises:

coding the digitized data to be transmitted through voltages selected from a set of coding voltages comprising at least two voltages of determined constant levels, and widening towards high frequencies the passband of each transmission line used by combination with correcting circuits selected so that the transfer function of the corrected line is substantially that of a reference filter, such as a filter of the Bessel type, in a frequency interval on either side of the 3-dB cut-off frequency (fc) of the corrected line, the frequency of the upper bound of said interval being proportional to this cut-off frequency, the proportionality coefficient ($k_1$) being higher than 2 and said cut-off frequency fc of the corrected line being selected as a function of the number of coding voltages of said set and of the allowable error rate.

The correcting circuits are, for example, selected in such a way that the transfer function of each corrected line substantially corresponds to that of a Bessel filter, at least in a frequency interval ($k_2$fc and $k_1$fc), where $k_1$ is a multiplicative factor at least equal to 2.5 and $k_2$ is a multiplicative factor of the order of 0.2.

According to one embodiment, transmission circuits are selected adapted for applying to the signals in said frequency interval a gain at the most equal to a limiting value decreasing correlatively with an increase in the selected number of coding voltages, for a set error rate depending on the noise level restored through said correcting circuits associated with each transmission line, and said cut-off frequency (fc), which the maximum transmission frequency depends on, is selected so that the amplitude increase to be applied to the signals transmitted on each transmission line is at the most equal to said limiting value (G).

According to a preferred embodiment, the transmission rate is increased by coding the signals to be transmitted by means of a set of coding voltages comprising at least eight coding voltages.

The transmission rate can be increased further by advantageously selecting a set of coding voltages comprising sixteen coding voltages.

This multiple voltage coding, this addition of particular filtering circuits, and this controlled widening of the passband make it possible to multiply by 3 or 4 the possible transmission rate of the most common multifunction cables, and this without increasing the transmission error rate.

The device for implementing the process comprises, for example, a coding set adapted for coding digitized signals to be transmitted with a selected number of coding voltages and for applying the coded digitized signals onto a transmission line, and filtering circuits adapted in such a way that the line combined with said filtering circuits has a transfer function preferably similar to that of a Bessel filter with a cut-off frequency fc selected as a function of the number of coding voltages used, of the transfer function of the transmission line alone, and of the noise features of said filtering circuits, in a frequency interval extending on either side of said cut-off frequency fc.

BRIEF DESCRIPTION OF THE DRAWINGS

Other features and advantages of the process and of the device according to the invention will be clear from reading the description hereafter of embodiments given by way of non limitative examples, with reference to the accompanying drawings in which:

FIGS. 8 and 9 show two relative lay-outs of the transfer function of a transmission line in relation to that of the Bessel filter equivalent to the same corrected line, respectively in the case of a two-voltage or bipolar coding and in the case of an 8-voltage coding, the relative lay-outs being, in both cases, selected in order to obtain a maximum rate without increasing the transmission error rate;

FIG. 10 shows an example of a response curve of a correcting circuit associated with a transmission line of the multifunction cable, underscoring the gain and the noise band centered on the maximum gain and about 200 kHz wide;

FIG. 11 shows a set of coding voltages with two symmetric coding voltages;

FIG. 12 shows a set of coding voltages with eight positive or negative voltages; and FIG. 13 schematically shows an example of a transmission system for applying signals coded with a multilevel code between two conductors of an electric carrying cable.

DESCRIPTION OF THE PREFERRED EMBODIMENTS

Figure 1:
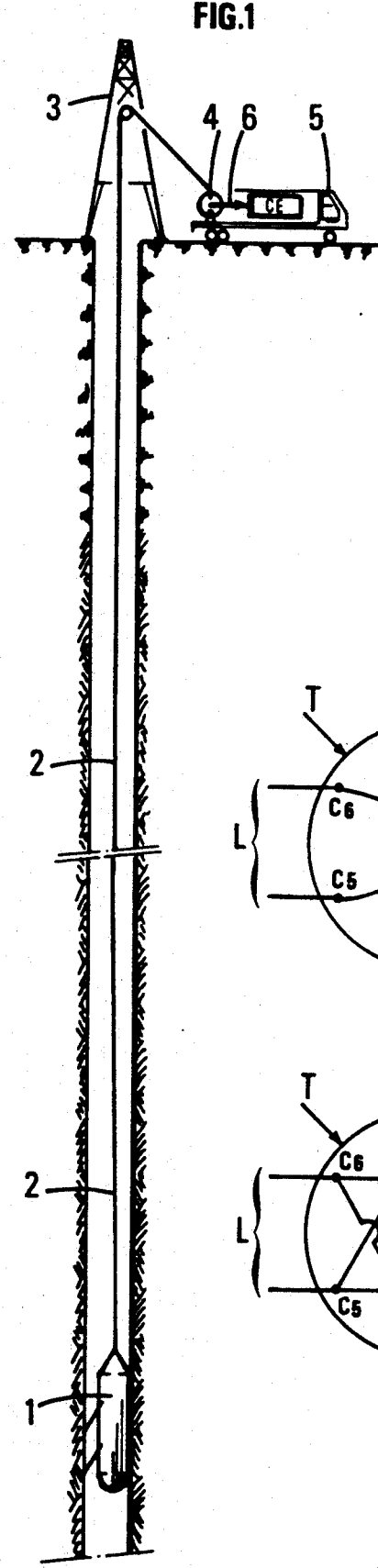
FIG. 1 shows a sonde lowered into a well, hanging on an electric carrying cable of the logging cable type for example.
Figure 2:
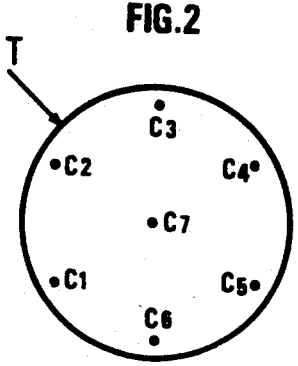
FIG. 2 schematically shows a cross-section of the lay-out of the conductors running along an electric carrying cable of a standard type.

The process according to the invention allows the transmission of signals exchanged between a control and recording system CE and a signal reception assembly contained in at least one sonde 1 (FIG. 1) which is, for example, of the type described in the U.S. Patents cited above. This sonde is suspended by an electric carrying cable 2 on a supporting structure 3 arranged at the surface, and the cable winds round the storage reel 4 of a recording truck 5. The utilized cable 2 is that which is generally used for taking sondes down into a well. It comprises for example (FIG. 2) seven conductors $C_1$ to $C_7$. The six conductors $C_1$ to $C_6$ are regularly arranged in the cable section at the same distance from the centre through which a central conductor $C_7$ passes. On the periphery, the cable comprises a metallic sheath T generally consisting of a braid. The seven conductors $C_1$ to $C_7$ of cable 1 wound round storage reel 4 (FIG. 1) are connected through a transmission cable 6 to the control and recording system CE arranged in recording truck 5.

Figure 6:
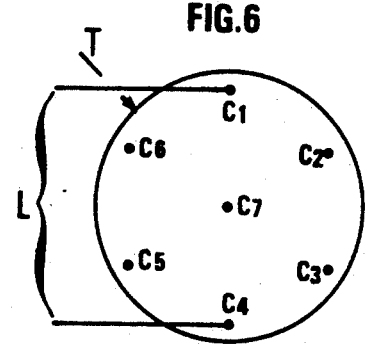

The data to be transmitted are applied onto a transmission line L obtained by combining conductors of the cable. According to the combination mode of FIG. 3, this line is obtained by interconnecting conductors $C_2$ and $C_5$ on one hand and conductors $C_3$ and $C_6$ on the other hand. The signals can also be applied between central conductor $C_7$ and braid T (FIG. 4) or between two conductors such as $C_1$ and $C_4$ for example (FIG. 6).

The line may also consist (FIG. 5) of triangular interconnections of conductors $C_1$, $C_3$ and $C_5$ on one hand and of conductors $C_2$, $C_4$ and $C_6$ on the other hand.

Such a sonde, possibly completed with one satellite sonde or a string of several satellite sondes, is lowered into wells, often at depths of several kilometers (between 3 and 7 km, and even more).

Figure 7:
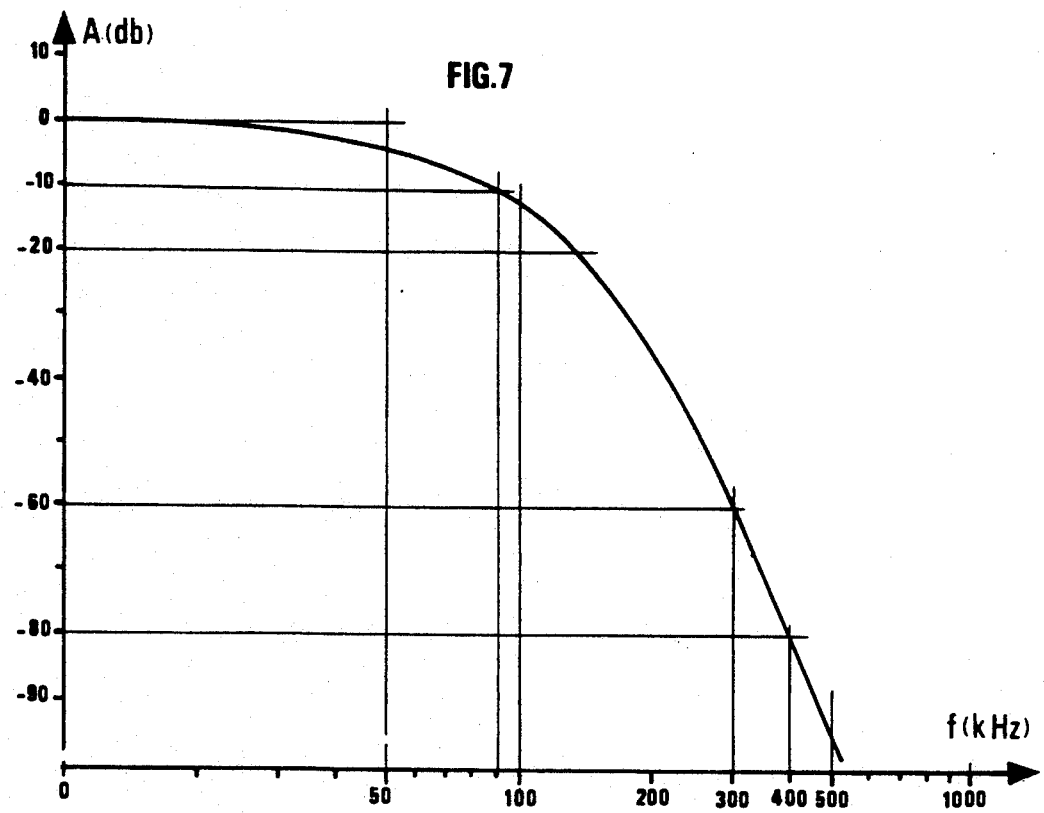
FIG. 7 shows the variation, as a function of the frequency, of the transfer function of a transmission line included in a multifunction cable such as a standard logging cable of a length of several kilometers with a filter attenuating low frequencies.

The transfer function shown by way of example in FIG. 7 is that of a standard logging cable of several kilometers length having a filter which attenuates frequencies below 30 kHz. The logging cable itself exhibits an attenuation close to 30 dB around 100 kHz and greater than 50 dB around 200 kHz. The result is that the transmission rate over a distance of several kilometers cannot exceed several hundred kilobits/s (generally 100 to 200 kb/s) when a bipolar coding mode such as code HDB3, well-known by specialists, is used. According to this coding mode, two symmetric amplitude voltages are used, one positive of $+V$ Volt, the other negative of $-V$ Volt (FIG. 11).

The optimization allowed by the process according to the invention first comprises adopting a multilevel coding mode. A set of 2, 4, 8, 16 or 32 coding voltages, symmetric two by two, is selected on either side of the 0 Volt voltage. The 2-level coding mode is a bipolar mode such as code HDB3 mentioned above. For an 8-level coding, each one of the symmetric voltages $+V$ and $-V$ available in the coding apparatus is subdivided into four. The amplitudes of the coding voltages are therefore respectively $V1=+V$, $V2=0.75V$, $V3=+0.5$ V, $V4=+0.25$ V, $V5=-0.25$ V, $V6=-0.5$ V, $V7=-0.75$ V and $V8=-V$. With this 8-level coding set (FIG. 12), it is well-known to transmit up to 3 bits simultaneously and therefore to increase the possible transmission rate without raising the passband.

Noise voltages vb coming from the correcting circuits (FIGS. 11 and 12), which are all the more high since the passband of the circuits is wider and the gain thereof higher, are superposed onto these coding voltages. The masking effect of these disturbances is more noticeable on the lower coding voltages, i.e. V4 and V5 (FIG. 12) and thus, with the same allowable error rate, the change from a bipolar coding (FIG. 11) to an 8-voltage coding (FIG. 12) makes it necessary to decrease the cut-off frequency of the corrected system.

If $a1=S/B$ is the signal-to-noise ratio in the bipolar code, it is necessary, for a 4-voltage coding, to fix a higher allowable ratio $a2=a1+c$, c being a deviation set at 6 dB if the same separating power is to be kept between the levels. For a 8-voltage and a 16-voltage coding, a value $a3=a1+2c$ and a value $a4=a1+3c$ are respectively fixed.

The process according to the invention comprises adding to each transmission line a particular correcting network which widens the passband of each line while avoiding the risks of overoscillations of the signals which generally generate errors upon decoding.

It has been found that the correcting network making it possible to optimize the lines should be selected so that the corrected line preferably has a transfer function equivalent to that of a Bessel filter, at least in a given frequency interval ($k_2 fc$, $k_1 fc$) around the 3-dB cut-off frequency fc of the Bessel filter equivalent to the corrected line, $k_1$ and $k_2$ being multiplicative coefficients. Coefficient $k_2$ is in the region of 0.2 for example. Coefficient $k_1$ is selected at least equal to 2 and preferably at least equal to 2.5.

The process further comprises selecting this cut-off frequency fc as a function of the transmission parameters. The noise amplitude bs allowable at the output of the correcting network being set according to the selected number of coding voltages, and the noise amplitude restored at the input by the same network will make it possible to determine the maximum gain that must be applied to the signals transmitted in the frequency band ($k_2 fc$, $k_1 fc$) and thus the maximum cut-off frequency fc which can be obtained with the transmission lines used.

The noise voltage restored at the input of a correcting network is generally expressed in $$nV = \sqrt{BF},$$

BF being the width of the frequency band to be amplified. The maximum frequency band BF being fixed, the total noise being restored can be deduced therefrom. The maximum gain G to be given to the correcting network is thus obtained with the bs/be ratio.

Figure 8:
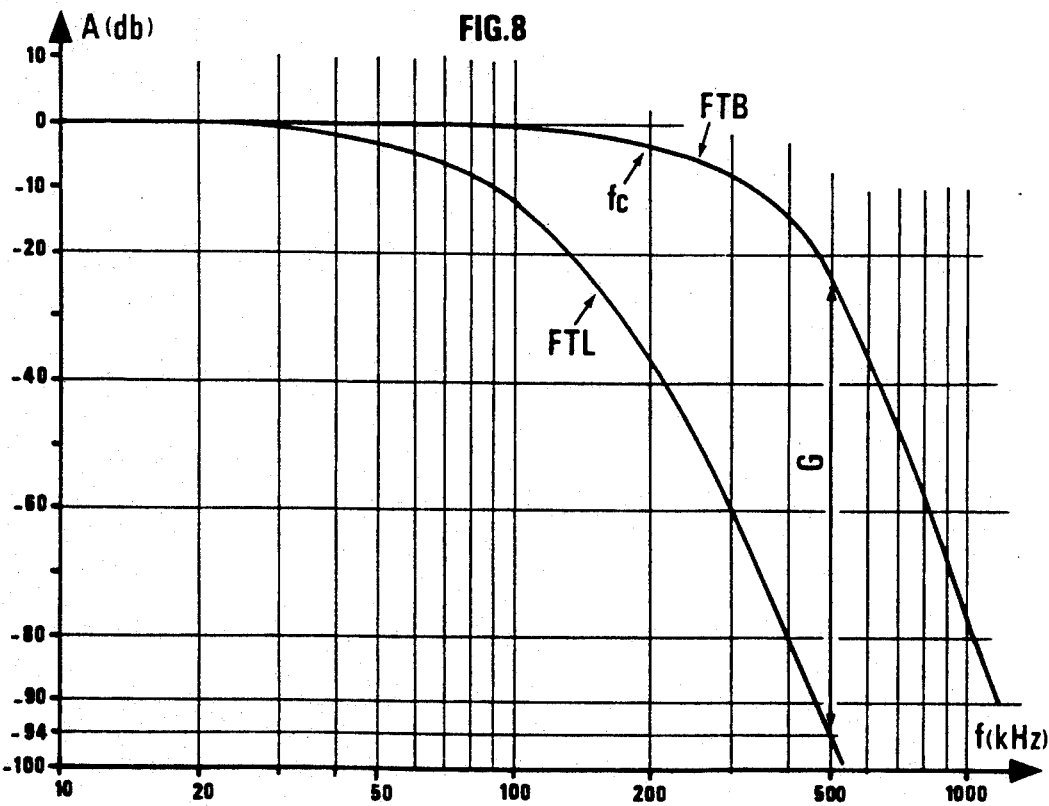

Gain G being imposed, the cut-off frequency fc of the equivalent Bessel filter can then be selected so that, whatever the frequency contained in the interval ($k_2 fc$, $k_1 fc$) may be, the amplitude increase to be applied to the signals is at the most equal to G (FIGS. 8, 9). The maximum possible transmission frequency Fm is proportional to the obtained frequency fc: $Fm = k \cdot fc$, with a coefficient k in the region of 2.2 for example. The rate Dm can be deduced through the relation $Dm = Fm \log_2 n$, where n is the number of coding levels.

Figure 3:
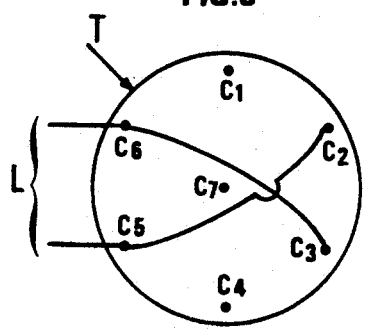
FIGS. 3 to 6 schematically show various modes of combination of the conductors of a cable making it possible to constitute one or several transmission lines.
Figure 4:
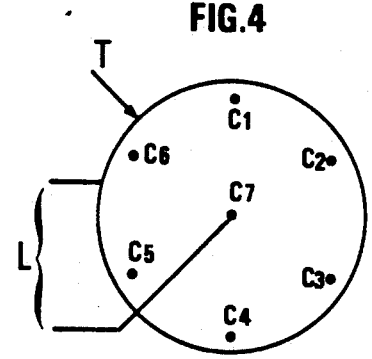
Figure 5:
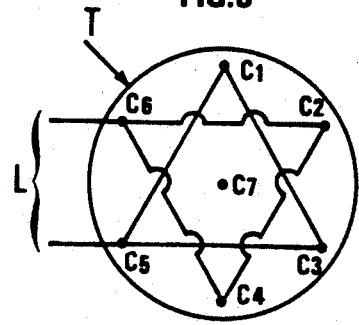

The examination hereafter of a particular embodiment will make it possible to put a figure to the results obtained in practice with the process according to the invention. A transmission cable where the lines have a transfer function FTC such as that shown in FIGS. 3 to 5 is used. The signal-to-noise ratio S/bs is, for example, set at 40 dB for a two-voltage bipolar code, at 52 dB, 58 dB and 64 dB respectively for an 8, 16 and 32-voltage coding, the noise be restored at the input of the line correcting circuits used is, for example, $$s(nV) = \sqrt{BF(Hz)},$$

the frequency band to be amplified is in the region of 250 kHz and the amplitude of signal S is set at 1 V for example.

With the above-mentioned numerical values, amplitude be is calculated equal to 2.5 micro-Volt, the maximum amplitudes bs are calculated with respect to the values of the imposed ratios S/bs, and it can be deduced that the gains G to be applied are 72 dB (FIG. 8), 60 dB, 54 dB (FIG. 5) and 48 dB respectively in case of bipolar codings and of an 8, 16 and 32-voltage coding. The deviations G between the transfer function of the transmission line alone FTL and that of the equivalent Bessel filter FTB being determined, one is translated in relation to the other until deviation G is obtained between them at the frequency $f2 = 2.5 \cdot fc$. This condition imposes the sought cut-off frequency fc. For a bipolar coding, fc is found to be substantially equal to 200 kHz (FIG. 8). With an 8-voltage coding, fc is substantially equal to 160 kHz (FIG. 9). It can also be established that fc is in the region of 150 kHz and 120 kHz respectively for a 16 and a 32-voltage coding.

Taking into account the number of bits which can be simultaneously transmitted according to the number of coding voltages used, it can be established that the rate Dm of such a line can reach optimum values of the order of 1.3 to 1.5 Mbits/s for a 16 or 32-voltage coding, and this without any overoscillation likely to cause decoding errors. It can be noticed that, considering the shape of the transfer curve of the lines used, the optimum rate is the highest for 16 or 32-level codings, and that an additional increase in the number of coding voltages causes no correlative increase in the possible rate.

The device for implementing the process (FIG. 13) is adapted for transmitting digitized data delivered by an acquisition system 7 generally comprising an input multiplexer 8 sequentially connecting to a variable-gain amplifying and filtering chain 9 such as those described in U.S. Pat. Nos. 4,779,055 or 4,774,474, and an analog to digital converter 10.

The digitized signals coming from the acquisition system are applied to a specialized coding set 11 of a well-known type adapted to the transmission code and to the number of coding voltages, before being applied to an emission set 12 which is connected to a line of cable 2 obtained through one of the combinations schematized in FIGS. 3 to 6.

Transmission set 12 comprises, for example, a voltage transformer 13 with a primary winding whose two ends are connected to coding set 11.

The secondary winding of voltage transformer 13 is for example, connected between central line $C_7$ and peripheral braid T. At the other end of cable 2, another voltage transformer 14 makes it possible to take out the signal transmitted between line $C_7$ and braid T. The signal at the secondary winding of transformer 14 is applied to a correcting set 15 adapted in such a way that the transmission line corrected by the effects of this set has a response substantially identical to that of a Bessel filter, at least in the defined interval ($k_2 fc$, $k_1 fc$). The signals coming from filtering set 15 are applied to a reception set 16 of a well-known type, adapted for releasing the digitized signals and thereafter to an adapted decoder 17 which restores the digitized signal transmitted.

Coding set 11 is adapted for transmitting the digitized signals at a rate at the most equal to the maximum rate D compatible with the parameters of the cable and of the electronic circuits of filtering set 15, as it has been seen in the course of the description.

We claim:

1. A process for optimizing the transmission rate of digitized signals on a transmission line having a predetermined passband and transfer function, without modifying the transmission error rate, the transmission line being included in a multifunction cable for linking well tools to surface installations, said process comprising:

coding the digitized signals utilizing coding voltages selected from a predetermined number of coding voltages, including at least two predetermined voltage levels, to form coded signals; and passing the coded signals through a correcting circuit in a corrected transmission line having a transfer function substantially the same as the transfer function of a Bessel-type reference filter in a frequency range extending on either side of a 3-dB cut-off frequency of the corrected transmission line, the upper frequency of the frequency range being proportional to the 3-dB cut-off frequency, with a proportionality coefficient greater than 2 and with the cut-off frequency of the corrected transmission line being a function of the predetermined number of coding voltages, the transmission error rate, and the noise of the filter circuit, thereby widening the passband of the corrected transmission line toward higher frequencies.

2. A process for optimizing the transmission rate of digitized signals on a transmission line having a predetermined passband and transfer function, without modifying the transmission error rate, the transmission line being included in a multifunction cable for linking well tools to surface installations, said process comprising:

coding the digitized signals utilizing coding voltages selected from a predetermined number of coding voltages, including at least two predetermined voltage levels, to form coded signals; and passing the coded signals through a correcting circuit in a corrected transmission line having a transfer function substantially the same as the transfer function of a Bessel-type reference filter in a frequency range extending on either side of a 3-dB cut-off frequency of the corrected transmission line, the frequency range having an upper limit $k_1 fc$ and a lower limit $k_2 fc$, where fc is the 3-dB cut-off frequency, $k_1 \geq 2.5$, and $k_2 = 0.2$, with the cut-off frequency of the corrected transmission line being a function of the predetermined number of coding voltages, the transmission error rate, and the noise of the filter circuit, thereby widening the passband of the corrected transmission line toward higher frequencies.

3. A process as claimed in claim 1 or 2, wherein the correcting circuit has a gain in said frequency interval at most equal to a limiting value, the limiting value decreasing correlatively with an increase in the number of coding voltages for a fixed transmission error rate and dependent on the noise level restored through the correcting circuits associated with the transmission line; and selecting said 3-dB cut-off frequency of the maximum transmission frequency so that the gain on the transmission line is at most equal to said limiting value.

4. A process as claimed in claim 1 or 2, wherein the predetermined number of coding voltages includes at least eight voltage levels.

5. A process as claimed in claim 1 or 2, wherein the predetermined number of coding voltages includes sixteen coding voltages.

6. Apparatus for optimizing the transmission rate of digitized signals on a transmission line having a predetermined passband and transfer function, without modifying the transmission error rate, the transmission line being included in a multifunction cable for linking well tools to surface installations, said apparatus comprising:

a coding assembly for coding the digitized signals with a predetermined number of coding voltages;

a transmission set for applying the coded signals onto a transmission line;

a receiving set for receiving the coded signals from the transmission line; and a filter circuit for correcting the transmission line to provide a transfer function substantially the same as the transfer function of a Bessel-type reference filter in a frequency range extending on either side of a 3-dB cut-off frequency of the corrected transmission line, the cut-off frequency being a function of the predetermined number of coding voltages, the transmission error rate, and the noise of said filter circuit.

* * * * *